3,378,530
Patented Apr. 16, 1968

3,378,530
PROCESS OF PREPARING COPOLYMERS OF TRIS(2 - HYDROXYETHYL)ISOCYANURATE AND FORMALDEHYDE
Edwin D. Little, Hopewell, Va., assignor to Allied Chemical Corporation, New York, N.Y., a corporation of New York
No Drawing. Filed Mar. 15, 1965, Ser. No. 439,982
1 Claim. (Cl. 260—67.6)

ABSTRACT OF THE DISCLOSURE

A novel copolymer and method for making same by heating tris-(2-hydroxyethyl)isocyanurate and formaldehyde in the presence of a condensation catalyst, such as sulfuric acid, at a temperature within the range of 95° C. to 160° C. to produce a resinous copolymer which is solid at temperatures of about 20° C.

---

This invention relates to copolymers of tris(2-hydroxyethyl)isocyanurate and formaldehyde and to a process for producing these copolymers.

For the sake of brevity tris(2-hydroxyethyl)isocyanurate will be referred to herein as THEIC.

As disclosed in United States Patent 3,088,948 of Edwin D. Little and Bing T. Poon, granted May 7, 1963, THEIC can be prepared by reacting cyanuric acid with ethylene oxide at temperatures of from about 25° C. to 140° C. in the presence of an inert solvent for the cyanuric acid and ethylene oxide and an alkaline catalyst.

THEIC does not react with formaldehyde at appreciable rates to form useful products in the absence of catalysts for the reaction and this even though the reaction mixture is heated to elevated temperatures just below that at which the formaldehyde is driven off under the pressure conditions at which the heating is conducted. Employing alkaline condensation catalysts reaction takes place to form a liquid or syrupy reaction product and not the solid copolymers of this invention.

It is a principal object of the present invention to provide a catalytic process for producing copolymers of THEIC and formaldehyde, which are solid resinous products at room temperature (about 20° C.).

Another object of this invention is to provide novel resinous copolymers, solid at room temperature, of formaldehyde and THEIC.

Other objects and advantages of this invention will be apparent from the following detailed description thereof.

The novel THEIC formaldehyde copolymers of this invention are hard, tough solids at room temperature possessing high resistance to organic liquids and to water. They are useful in the adhesive, coating, laminating and molding resin fields; in the finishing of textiles, and in other fields where hard, tough, organic liquids and water-resistant resins find application.

In accordance with the process aspects of this invention THEIC is reacted with formaldehyde at a temperature of 95° C. to 160° C., in a mol ratio of 0.5 to 5 mols of formaldehyde per mol of THEIC, preferably 1 to 1.5 mols of formaldehyde per mol of THEIC, in the presence of an etherification-type condensation catalyst. The copolymer is obtained as a solid resinous product or as a viscous liquid which becomes a solid on cooling, depending chiefly on the temperature conditions under which the reaction is carried out.

The use of an etherification-type condensation catalyst is an important feature of the present invention. These catalysts have high dissociation constants and result in a reaction mixture having a pH within the range of 0 to 6. Examples of such catalysts are sulfuric acid, phosphoric acid, boron trifluoride and its hydrates, trichloroacetic acid and aromatic sulfonic acids such as benzene sulfonic acid and toluene sulfonic acid. As noted, the use of other condensation catalysts such as alkaline catalysts does not result in the formation of solid copolymers. The expression etherification-type condensation catalysts is used in the claims to include all such catalysts having high dissociation constants and produce a pH ranging between 0 and 6 which result in the formation of solid copolymers. The quantity of catalyst added to the reaction mixture can vary over a wide range; it is preferred to employ the catalyst in amount of about 0.5 to 2% by weight of the THEIC.

Also important are the temperature conditions at which the reaction is carried out. At temperatures below 95° C. little or no reaction occurs. At temperatures above 160° C. loss of formaldehyde takes place during the reaction.

Water is formed during the course of the reaction. As the reaction proceeds the reaction mass becomes more viscous and water is more difficult to remove from the mass in the latter stages of the reaction. It is convenient to remove the last part of the water by maintaining reduced pressure over the mass. However, it should be possible to operate at atmospheric pressure by completing the reaction in equipment which would expose fresh surfaces for evaporation of moisture. Hot rolls are normally used for this purpose.

Reaction time is not critical. It depends chiefly upon the temperature and catalyst employed. Generally the reaction is carried out over a period of 0.2 to 12 hours, the preferred time is 0.5 to 3 hours. Hygroscopic copolymers result when the reaction is not carried to the point where at least one mol of water is removed per mol of THEIC. On the other hand, excessive condensation diminishes the moldability of the product.

The formaldehyde used can be the formaldehyde of commerce, such as formalin (a solution containing about 37% by weight of formaldehyde in water usually with 10–15% methanol to prevent polymerization), paraformaldehyde, trioxymethylene and other formaldehyde polymers which decompose to form formaldehyde. The expression formaldehyde is used in the claims to include formaldehyde polymers and compounds which release formaldehyde in aqueous solutions.

It is preferred to carry out the reaction without using extraneous solvents. A liquid melt of THEIC with paraformaldehyde and an etherification-type condensation catalyst gives successful polymerization. Copolymerization involving paraformaldehyde are preferably carried out at temperatures in the range of 120° C. to 150° C. Using formalin, the water in the formalin serves as a solvent during the initial stage of condensation; copolymers are readily obtained by a direct one-stage condensation at temperatures of 95° C. to 100° C. Alternatively, a two-stage process may be used with water removal in the first stage and final condensation at a temperature within the range of 120–160° C. in the second stage. Thus, this invention comprises carrying out the condensation in either a one-stage or two-stage treatment at temperatures within the range from 95° C. to 160° C. employing a mol ratio of from 0.5 to 5 mols of formaldehyde per mol of THEIC to produce hard, tough resinous products possessing high resistance to organic liquids, to water, useful in the adhesive, coating, molding resin and other fields.

The following examples are given to illustrate preferred embodiments of the invention. It will be understood that the invention is not limited to these examples.

EXAMPLE I

Forty-five grams of paraformaldehyde (1.5 mols) was added to 261 grams (1.0 mol) of THEIC (melting point 135° C.) in a one-liter, round bottom flask. The mixture was heated at 120°–130° C. for 0.5 hour until all the paraformaldehyde was dissolved. The viscous liquid was then cooled to 80° to 90° C., and 2.6 grams of concentrated sulfuric acid was added with stirring. The flask was attached to an evaporator and the reaction mixture was heated at 130° to 150° C. under 10 to 18 mm. Hg for about 1.5 hours to remove water of reaction. About 1.1 mols of water per mol of THEIC was eliminated. A water-insoluble resin was obtained which was clear, colorless, tough and flexible.

EXAMPLE II

About 261 grams (1.0 mol) of THEIC and 122 grams (1.5 mols) of 37% formalin was heated in an one-liter round bottom flask for 0.5 hour at 95° C. until the THEIC dissolved. 2.6 grams of concentrated sulfuric acid was then added, the flask was connected to an evaporator and heated at a temperature of about 100° C. under 3–5 mm. Hg pressure until a viscuous resin was formed. About 3 hours' heating was required. On cooling to room temperature, a hard, tough, clear resin was produced.

To demonstrate the desirable properties of the resin produced in Example I, particularly its hardness and moldability, this resin was ground, and the ground particles pressed in a 4" die at 5000 p.s.i. for 15 minutes to give tough, clear discs about 0.05" thick. Specimens were cut from these discs and tested in a Clash-Berg apparatus employing ASTM procedure No. D1043–51. These tests showed that the rigidity of the copolymer at 20–100 C. range was substantially the same as the polystyrene, Lucite and polyvinyl chloride commercial resins.

The copolymer produced in Example II was warmed in a steam bath until a viscous liquid formed and this liquid was applied to the surfaces of 3 plys of wood veneer. These plys were dried at 125–130° C. for 15–20 minutes, then pressed together for 3 minutes at 135° C. under 5000 p.s.i. pressure. The resulting plywood was tested using a standard testing technique and it was found that it required from 320–420 p.s.i. to rupture the plywood.

It will be noted the present invention provides a catalytic process for producing copolymers of THEIC and formaldehyde which at room temperatures are solid, tough resinous products having high resistance to organic liquids and to water. These resinous copolymers as well as the processes of producing same, herein disclosed, are novel.

Since certain changes in carrying out the process of copolymerizing THEIC and formaldehyde as herein disclosed, as well as modifications in the resultant copolymers which embody this invention, can be made, without departing from its scope, it is intended that all matter contained in the above description shall be interpreted as illustrative and not in a limiting sense.

I claim:
1. The process of producing a resinous copolymer of tris(2-hydroxyethyl)isocyanurate and formaldehyde which consist of heating a mixture of tris(2-hydroxyethyl)isocyanurate and paraformaldehyde containing from 1 to 3 mols of formaldehyde per mol of tri(2-hydroxyethyl(isocyanurate at a temperature within the range of 95° C. to 160° C. in the presence of sulfuric acid and recovering the resultant copolymer from the reaction mixture.

References Cited
UNITED STATES PATENTS 3,296,207   1/1967   Cummins _____ 260—67.5

WILLIAM H. SHORT, *Primary Examiner.*

H. SCHAIN, *Assistant Examiner.*